United States Patent
Hama et al.

(10) Patent No.: US 10,635,799 B2
(45) Date of Patent: Apr. 28, 2020

(54) BIOMETRIC AUTHENTICATION APPARATUS, BIOMETRIC AUTHENTICATION METHOD, AND NON-TRANSITORY COMPUTER-READABLE STORAGE MEDIUM FOR STORING PROGRAM FOR BIOMETRIC AUTHENTICATION

(71) Applicant: FUJITSU LIMITED, Kawasaki-shi, Kanagawa (JP)

(72) Inventors: Soichi Hama, Atsugi (JP); Yukihiro Abiko, Kawasaki (JP); Satoshi Maeda, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/886,923

(22) Filed: Feb. 2, 2018

(65) Prior Publication Data

US 2018/0225438 A1      Aug. 9, 2018

(30) Foreign Application Priority Data

Feb. 7, 2017   (JP) .................. 2017-020458

(51) Int. Cl.
  *G06K 9/00* (2006.01)
  *G06F 21/32* (2013.01)
  *G06F 3/041* (2006.01)

(52) U.S. Cl.
  CPC ............. *G06F 21/32* (2013.01); *G06F 3/041* (2013.01); *G06K 9/00013* (2013.01); *G06K 9/00355* (2013.01); *G06K 2009/00395* (2013.01)

(58) Field of Classification Search
  None
  See application file for complete search history.

(56) References Cited

U.S. PATENT DOCUMENTS 7,031,502 B1   4/2006  Mil'shtein et al.
8,031,175 B2 * 10/2011  Rigazio ............... G06F 3/04883
                                                    345/158

(Continued)

FOREIGN PATENT DOCUMENTS

| EP | 2551790 | 1/2013 |
| JP | 2014-215868 | 11/2014 |
| WO | 2014/174674 | 10/2014 |

OTHER PUBLICATIONS

Miller, Benjamin, "Vital signs of identity", Special Report: Biometrics, IEEE Spectrum, vol. 31, Issue. 2, pp. 22-30, Feb. 1, 1994, XP011419739. Cited in Extended European Search Report (EESR) dated Jul. 2, 2018 for corresponding European Patent Application No. 18155072.4.

(Continued)

*Primary Examiner* — Feng Niu
(74) *Attorney, Agent, or Firm* — Fujitsu Patent Center

(57) ABSTRACT

A biometric authentication apparatus includes: a biometric sensor configured to capture an image of a hand of a user; a touch panel configured to output a contact signal indicating contact positions of fingers of the user in response to the reception of an operation by the fingers of the user; and control circuitry configured to display, on the touch panel, a plurality of marks each of which indicates position at which any of the fingers of the user is intended to come into contact with the touch panel, acquire the contact signal output from the touch panel, and reduce in size one or more marks among the plurality of marks during acquiring biometric information from the image captured by the biometric sensor when the control circuitry detects, in accordance with the contact signal, that the fingers of the user are in contact with the plurality of marks.

15 Claims, 18 Drawing Sheets

(56) References Cited

U.S. PATENT DOCUMENTS

| | | | | |
|---|---|---|---|---|
| 8,624,859 | B2* | 1/2014 | Aono | G06F 3/0414 |
| | | | | 178/18.03 |
| 9,098,756 | B2* | 8/2015 | Endoh | G06K 9/00919 |
| 9,697,415 | B2* | 7/2017 | Jo | G06T 3/40 |
| 10,156,941 | B2* | 12/2018 | Roziere | G06F 3/041 |
| 2009/0262073 | A1 | 10/2009 | Rigazio et al. | |
| 2013/0141378 | A1* | 6/2013 | Yumiki | G06F 3/041 |
| | | | | 345/173 |
| 2016/0034747 | A1 | 2/2016 | Jo et al. | |

OTHER PUBLICATIONS

Extended European Search Report dated Jul. 2, 2018 for corresponding European Patent Application No. 18155072.4, 8 pages.

\* cited by examiner

BIOMETRIC AUTHENTICATION APPARATUS, BIOMETRIC AUTHENTICATION METHOD, AND NON-TRANSITORY COMPUTER-READABLE STORAGE MEDIUM FOR STORING PROGRAM FOR BIOMETRIC AUTHENTICATION

CROSS-REFERENCE TO RELATED APPLICATION

This application is based upon and claims the benefit of priority of the prior Japanese Patent Application No. 2017-020458, filed on Feb. 7, 2017, the entire contents of which are incorporated herein by reference.

FIELD

The embodiments discussed herein are related to a biometric authentication apparatus, a biometric authentication method, and a non-transitory computer-readable storage medium for storing a program for biometric authentication.

BACKGROUND

In order to ensure security upon access to important data via a terminal, biometric authentication is used, for example. The biometric authentication is a technique for confirming the identical person using biometric characteristics such as a fingerprint, the person's face, or veins. In the biometric authentication, acquired biometric information is compared with biometric information registered in advance, and the identical person is confirmed based on whether or not the acquired biometric information matches the registered biometric information. The biometric information to be compared may be biometric characteristic information indicating characteristics of the biometric information.

Since the portability of mobile terminals is being improved, the usability of security functions of the mobile terminals is requested. It is, however, difficult to fix a mobile terminal or stably hold the mobile terminal, depending on the use of the mobile terminal. Thus, if biometric information is imaged in a contactless manner in palm vein authentication or the like, the quality of the acquired biometric information may be degraded due to hand movement. As a result, the identical person may be easily rejected, the number of operations and operation time may increase due to the re-imaging of biometric information or the like, and the usability of the mobile terminal may be reduced.

A large number of mobile terminals include a touch panel. Thus, a technique for acquiring biometric information in a state in which a finger of a user is in contact with a touch panel and in which a relative position of a hand with respect to a mobile terminal is stable has been proposed. In addition, a technique for efficiently acquiring biometric information by sequentially displaying, to a user, a position on a touch panel at which a finger contacts the touch panel has been proposed.

Examples of the related art include International Publication Pamphlet No. WO2014/174674 and Japanese Laid-open Patent Publication No. 2014-215868.

SUMMARY

According to an aspect of the invention, a biometric authentication apparatus includes: a biometric sensor configured to capture an image of a hand of a user; a touch panel configured to output a contact signal indicating contact positions of fingers of the user in response to the reception of an operation by the fingers of the user; and control circuitry configured to display, on the touch panel, a plurality of marks each of which indicates a position at which any of the fingers of the user is intended to come into contact with the touch panel, acquire the contact signal output from the touch panel, and reduce in size one or more marks among the plurality of marks during acquiring biometric information from the image captured by the biometric sensor when the control circuitry detects, in accordance with the contact signal, that the fingers of the user are in contact with the plurality of marks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The sizes of hands vary from person to person. Thus, since a user is forced to maintain a hand in an inappropriate posture for imaging and it is difficult to stably image a palm in a fixed acquisition method or in accordance with a fixed input instruction, the accuracy of biometric authentication may be reduced. For example, if a palm is to be imaged, a user with a small hand is forced to spread user's fingers for the imaging of a palm, and a user with a large hand is forced to close user's fingers for the imaging of a palm.

In conventional biometric authentication, individual differences between biometric parts of users are not considered for the acquisition of biometric information of the biometric parts such as palms. Thus, if biometric authentication is executed using a biometric part imaged in an inappropriate state such as a state in which a user is forced to maintain the biometric part in an uncomfortable posture, it is difficult to stably image the biometric part and improve the accuracy of the biometric authentication.

In other words, since individual differences between biometric parts of users are not considered in conventional techniques, it is difficult to improve the accuracy of biometric authentication using imaged biometric parts.

According to an aspect of the present disclosure, provided are technologies for improving the accuracy of biometric authentication.

According to a biometric authentication apparatus disclosed herein, a biometric authentication method disclosed herein, and a biometric authentication program disclosed herein, when multiple marks specifying positions at which a user uses fingers to contact a touch panel are displayed on the touch panel, and the contact of the fingers with the multiple marks is detected, one or more marks among the marks are reduced and biometric information of a user's hand imaged by a biometric sensor is acquired.

Hereinafter, embodiments of the biometric authentication apparatus disclosed herein, the biometric authentication method disclosed herein, and the biometric authentication program disclosed herein are described with reference to the accompanying drawings.

Embodiments

A biometric authentication technique is to confirm the identical person using characteristic biometric information that indicates a fingerprint, a face, a palm, irises, veins, or the like and varies from person to person. For example, palm authentication is to execute biometric authentication using biometric information indicating palm veins, a palm print, or the shape of a palm. The palm authentication is described below as an example, but biometric authentication is not limited to the palm authentication.

In an embodiment, a biometric authentication apparatus described below may be installed in a terminal. The terminal may be a mobile terminal. The terminal may be a personal computer, a tablet, a smartphone, or the like.

Figure 1:
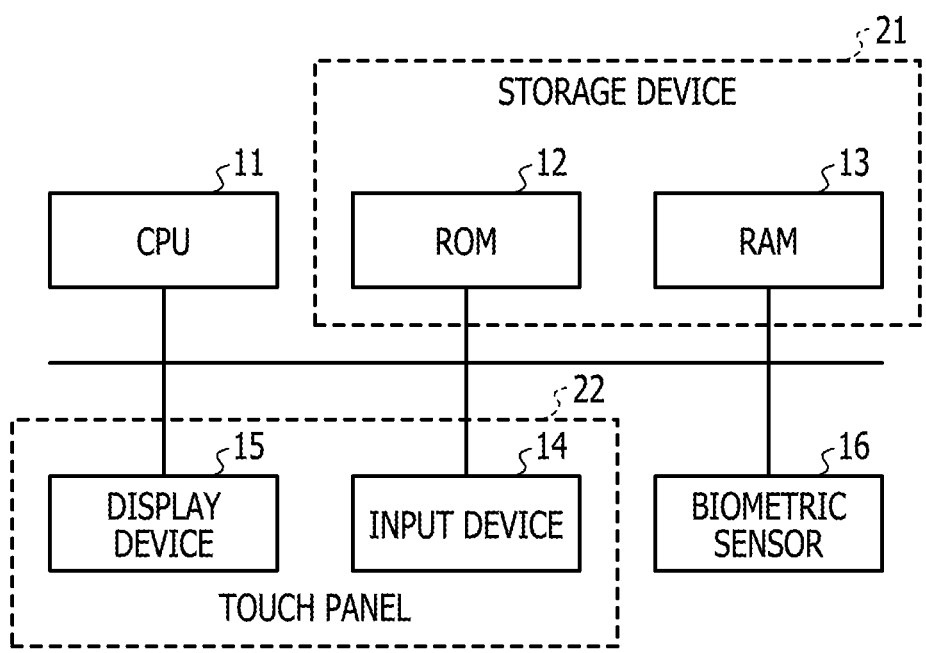
FIG. 1 is a block diagram illustrating an example of a hardware configuration of a terminal according to an embodiment.

FIG. 1 is a block diagram illustrating an example of a hardware configuration of the terminal according to the embodiment. In this example, a terminal 1 is a mobile terminal such as a tablet or a smartphone. The terminal 1 includes a central processing unit (CPU) 11, a read only memory (ROM) 12, a random access memory (RAM) 13, an input device 14, a display device 15, and a biometric sensor 16, which are connected to each other as illustrated in FIG. 1. If the terminal 1 has a communication function, the terminal 1 may include a known communication section (not illustrated) that executes transmission and reception. In addition, if the terminal 1 has a function of connecting the terminal 1 to an external network (not illustrated) such as the Internet, the terminal 1 may include a known interface (not illustrated).

The CPU 11 is an example of a controller (or a computer) that controls the entire terminal 1. Thus, the controller also controls the biometric authentication apparatus. The ROM 12 and the RAM 13 may form a storage device 21 that is an example of a storage section. In this example, the input device 14 and the display device 15 are included in a touch panel 22.

The CPU 11 may execute a computer program including a biometric authentication program and stored in the ROM 12, thereby achieving various functions of the terminal 1 including the biometric authentication apparatus. The ROM 12 stores the computer program to be executed by the CPU 11, various types of data, and the like. The ROM 12 is an example of a computer-readable storage medium storing a program. The RAM 13 stores various types of data and registered biometric information.

The input device 14 of the touch panel 22 has a function of outputting a contact signal indicating the contact of user's fingers with the touch panel 22 and inputting the contact signal to the CPU 10. The contact signal to be output by the input device 14 of the touch panel 22 indicates contact positions that are on the touch panel 22 and at which the user's fingers have contacted the touch panel 22 or coordinates of the contact positions, the areas of contact regions of the user's fingers at the contact positions on the touch panel 22, the shapes of the contact regions of the user's fingers at the contact positions on the touch panel 22, and the like. The input device 14 of the touch panel 22 also has a function of inputting, to the CPU 11, information that is a character or the like and is indicated by a position at which a user's finger has contacted the touch panel 22 to input the character or the like. The touch panel that outputs the contact signal and the information such as the character or the like is known. The CPU 11 may use a known method to detect, based on the contact signal, that the user is performing an operation of sliding fingers on the touch panel 22.

The display device 15 of the touch panel 22 has a function of displaying characters, figures, messages, multiple marks, input positions including current positions of the user's fingers on the touch panel 22, trajectories and directions of a slide operation, and the like, as described later. The multiple marks correspond to an example of a plurality of marks each of which indicates a position at which any of the fingers of the user is intended to come into contact with the touch panel.

The biometric sensor 16 has a function of imaging a biometric part in a contactless manner in this example. The biometric sensor 16 includes a camera and may include a biometric illumination light source. In this example, the biometric sensor 16 is located in the vicinity of the touch panel 22 and attached to a surface of the terminal 1 on which the touch panel 22 is installed.

The biometric sensor 16 may be a camera for imaging palm veins, a palm print, the shape of a palm, finger's veins, or the like, for example. Alternatively, the biometric sensor 16 may be a near-infrared sensor (or a near-infrared camera) including a near-infrared illumination light source and an image sensor (or a camera) having sensitivity to a near-infrared wavelength region to be used to image palm veins, finger's veins, or the like, for example. Alternatively, the biometric sensor 16 may include a near-infrared sensor and a camera having sensitivity to a wavelength region other than the near-infrared wavelength region.

Figure 2:
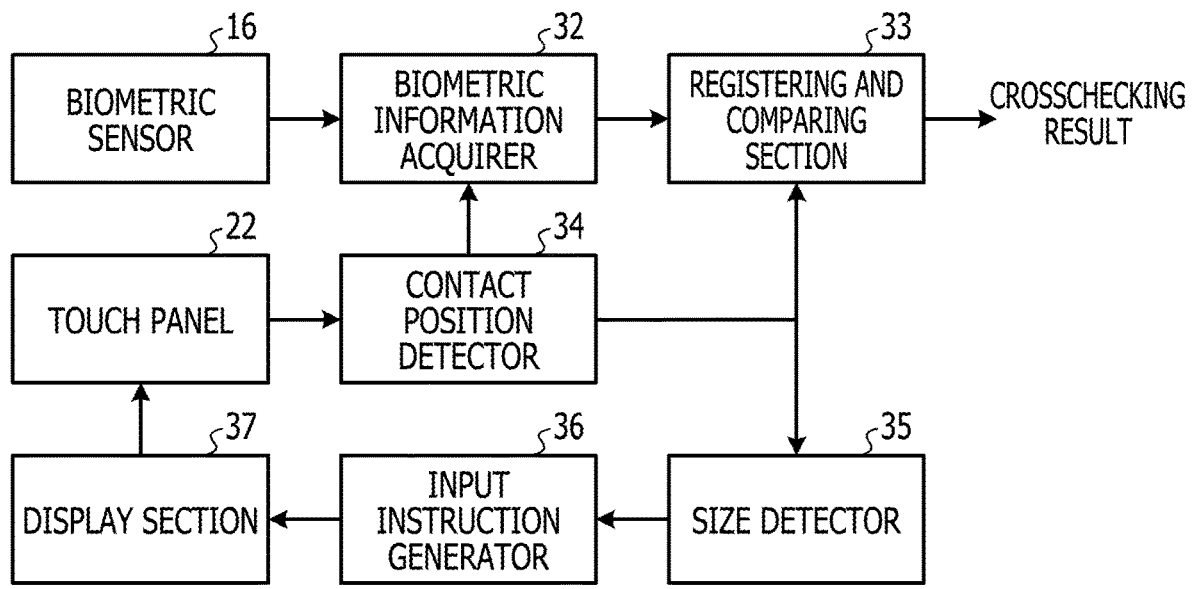
FIG. 2 is a functional block diagram illustrating an example of the configuration of a biometric authentication apparatus according to the embodiment.

FIG. 2 is a functional block diagram illustrating an example of the configuration of the biometric authentication apparatus according to the embodiment. A biometric authentication apparatus 31 illustrated in FIG. 2 includes a biometric information acquirer 32 to which biometric information is input from the biometric sensor 16, a registering and comparing section 33, a contact position detector 34 to which a contact signal and the like are input from the touch panel 22, a size detector 35, an input instruction generator 36, and a display section 37. The biometric information acquirer 32, the registering and comparing section 33, the contact position detector 34, the size detector 35, the input instruction generator 36, and the display section 37 may be achieved by the CPU 11 illustrated in FIG. 1, for example, and may be included in the controller achieved by the CPU 11, for example. The CPU 11 may execute the biometric authentication program stored in, for example, the storage device 21 illustrated in FIG. 1, thereby achieving functions of the biometric information acquirer 32, the registering and comparing section 33, the contact position detector 34, the size detector 35, the input instruction generator 36, and the display section 37, for example.

First, operations to be executed in the registration of biometric information are described below. In the registration of the biometric information, the input instruction generator 36 generates multiple marks each of which indicates a position at which any of the fingers of the user is intended to come into contact with the touch panel 22. Setting values with respect to the multiple marks described later may be stored in, for example, the storage devices 21 illustrated in FIG. 1 by default. In this case, the input instruction generator 36 may read the setting values with respect to the multiple marks from the storage device 21. The display section 37 displays on the touch panel 22 the multiple marks generated by the input instruction generator 36 in accordance with the setting values. When the user uses user's fingers to come into contact with the multiple marks on the touch panel 22, the touch panel 22 outputs, to the contact position detector 34, a contact signal indicating that the user's fingers have contacted (touched) the multiple marks. Upon detecting, based on the contact signal, that the user's fingers have contacted all the multiple marks, the contact position detector 34 outputs the contact signal to the size detector 35.

The size detector 35 detects the size of a hand of the user based on contact positions of the fingers on the touch panel 22, the areas of contact regions of the fingers on the touch panel 22, the shapes of the contact regions of the fingers on the touch panel 22, and the like that are indicated by the contact signal. The size of the hand includes the lengths of the fingers of the hand, the widths of the fingers, the size of the palm of the hand, and the like. The input instruction generator 36 adjusts one or more display positions of one or more marks to be reduced on the touch panel 22, based on the hand's size detected by the size detector 35, and outputs, to the display section 37, an instruction indicating the adjusted one or more display positions of the one or more marks. The input instruction generator 36 may output, to the touch panel 22, an instruction indicating either or both of trajectories and directions of a user operation of sliding the fingers from the multiple marks, based on one or more types of the contact positions of the fingers on the touch panel 22, the areas of the contact regions of the fingers at the contact positions on the touch panel 22, and the shapes of the contact regions of the fingers at the contact positions on the touch panel. The contact positions, the areas of the contact regions, and the shapes of the contact regions are indicated by the contact signal. In the generation of the multiple marks specifying the positions at which the user uses fingers to contact the touch panel, the input instruction generator 36 reduces, based on the hand's size detected by the size detector 35, the one or more marks of which the one or more display positions on the touch panel 22 have been adjusted. The display section 37 displays, on the touch panel 22, the multiple marks generated by the input instruction generator 36 and including the one or more reduced marks. Thus, the one or more marks among the multiple marks contacted by the user's fingers and displayed on the touch panel 22 are reduced.

Upon receiving, from the input instruction generator 36, the instruction indicating either or both of the trajectories and directions of the user operation of sliding the fingers from the multiple marks, the display section 37 displays, on the touch panel 22, either or both of the trajectories and directions of the slide operation. Specifically, the display section 37 displays, on the touch panel 22, the multiple marks generated by the input instruction generator 36 and including the one or more reduced marks and either or both of the trajectories and directions of the slide operation. The contact position detector 34 may detect, based on the contact signal, that the user is performing the operation of sliding the fingers from the multiple marks. When the contact position detector 34 detects that the user is performing the slide operation, the biometric information acquirer 32 acquires biometric information of the user's hand imaged by the biometric sensor 16 during the slide operation. During the slide operation, the biometric information acquirer 32 may continuously or regularly acquire biometric information of the user's hand imaged by the biometric sensor 16.

The biometric information acquirer 32 that is configured to acquire biometric information of a user's hand imaged by the biometric sensor 16 may acquire, only during the slide operation, the biometric information output from the biometric sensor 16 activated during a time period for reading the biometric information. Alternatively, the biometric information acquirer 32 may activate the biometric sensor 16 only during the slide operation and acquire the biometric information output from the biometric sensor 16.

In this manner, the contact position detector 34 outputs the contact signal to the size detector 35, and the input instruction generator 36 updates the input instruction based on the size of the user's hand detected by the size detector 35. The display section 37 displays the multiple marks on the touch panel 22 based on the input instruction updated and output by the input instruction generator 36.

The biometric information acquirer 32 outputs the biometric information imaged by the biometric sensor 16 to the registering and comparing section 33. The registering and comparing section 33 registers the biometric information in, for example, the storage device 21 illustrated in FIG. 1. The biometric information output by the biometric information acquirer 32 to the registering and comparing section 33 and registered by the registering and comparing section 33 may be biometric characteristic information indicating characteristics of the biometric information. If the biometric characteristic information is to be extracted from the biometric information, the biometric characteristic information may be extracted using a known method. Since the size detector 35 detects the size of the hand, it is clear which part of the user's hand corresponds to the biometric information registered by the registering and comparing section 33.

Next, operations to be executed in the authentication of biometric information are described. The operations to be executed in the authentication of biometric information are the same as the aforementioned operations to be executed in the registration of biometric information, except for a process to be executed by the registering and comparing section 33. In the authentication of biometric information, biometric information is already registered in, for example, the storage device 21 illustrated in FIG. 1. Thus, the registering and comparing section 33 compares biometric information acquired by the biometric information acquirer 32 in the authentication of the biometric information with the biometric information registered in, for example, the storage device 21 illustrated in FIG. 1. If biometric characteristic information indicating characteristics of the biometric information is already registered, the biometric information output by the biometric information acquirer 32 to the registering and comparing section 33 and compared by the registering and comparing section 33 may be the biometric characteristic information indicating the characteristics of the biometric information. If the biometric information acquired in the authentication matches the registered biometric information, the registering and comparing section 33 determines that the biometric authentication has been successful, and the registering and comparing section 33 outputs the comparing result indicating that the user is the identical person. The comparing result may be output to and displayed on the touch panel 22 or may be output as audio information using a known method, for example.

The biometric information acquirer 32, the contact position detector 34, the size detector 35, the input instruction generator 36, and the display section 37 may form an example of a controlling section that receives a contact signal output from the touch panel 22 and indicating contact with the touch panel 22 and controls display on the touch panel 22. When the controlling section displays, on the touch panel 22, the multiple marks specifying the positions at which the user uses user's fingers to contact the touch panel 22, and the controlling section detects, based on a contact signal, that the user has contacted the multiple marks using the fingers, the controlling section reduces one or more of the multiple marks and acquires biometric information of the user's hand imaged by the biometric sensor 16.

In this example, the multiple marks indicating the positions at which fingers contact the touch panel are displayed on the touch panel, and one or more of the marks are reduced in response to the contact of the fingers with the marks. Thus, regardless of the size of the user's hand, the multiple fingers may easily contact the marks specifying the contact positions of the fingers without maintaining the hand in an uncomfortable posture. In addition, when the user starts performing an operation of sliding multiple user's fingers, one or more of the multiple marks are reduced and an instruction suitable for the size of the user's hand and indicating either or both of trajectories and directions of the slide operation is displayed on the touch panel. As a result, when the user performs the biometric authentication while using multiple fingers to contact the touch panel of the terminal, the accuracy of the biometric authentication may be improved, regardless of individual differences between the sizes of users' hands.

First Embodiment

Figure 3:
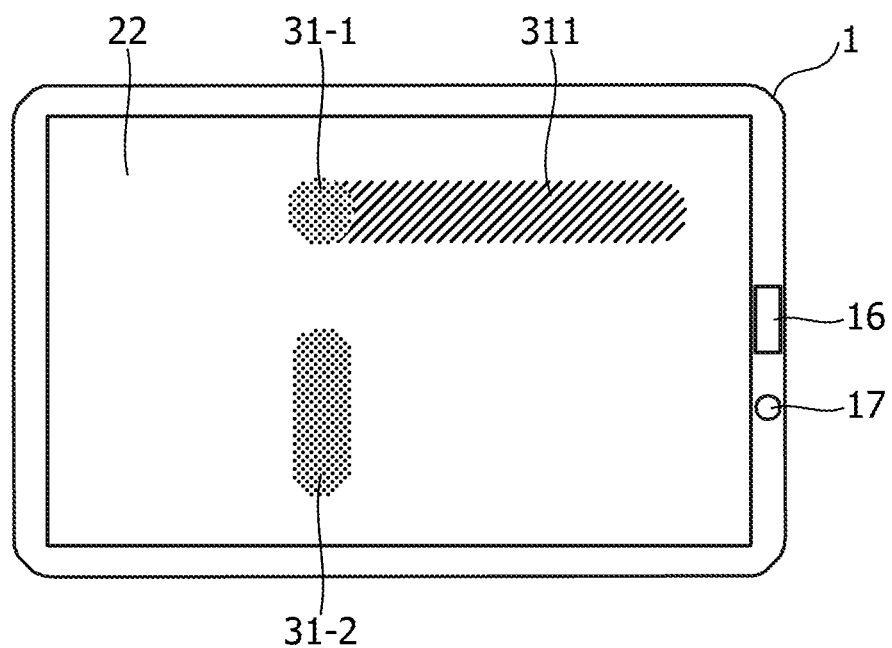
FIG. 3 is a plan view describing an example of the display of marks according to a first embodiment.
Figure 4:
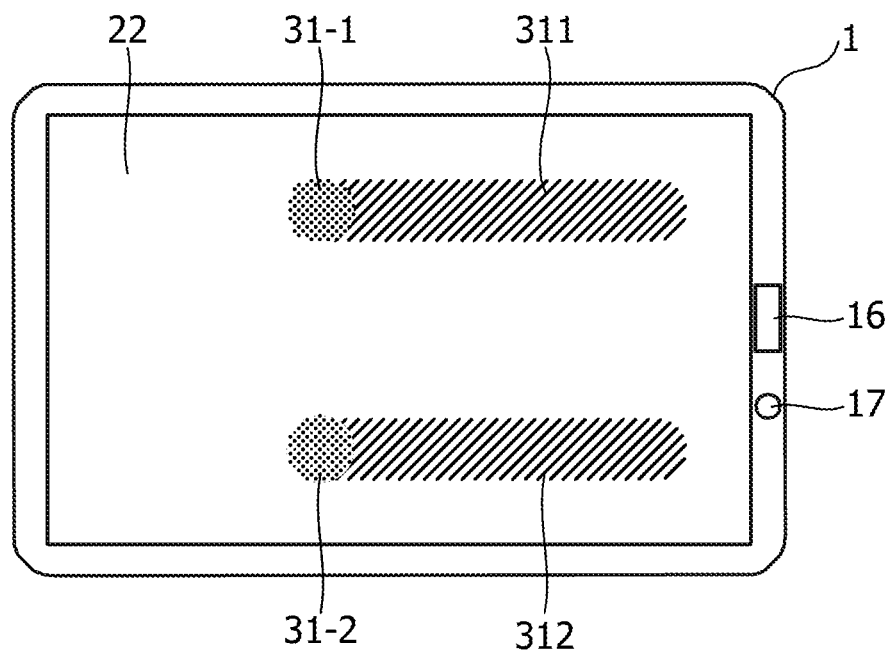
FIG. 4 is a plan view describing an example of the display of the marks according to the first embodiment.
Figure 5:
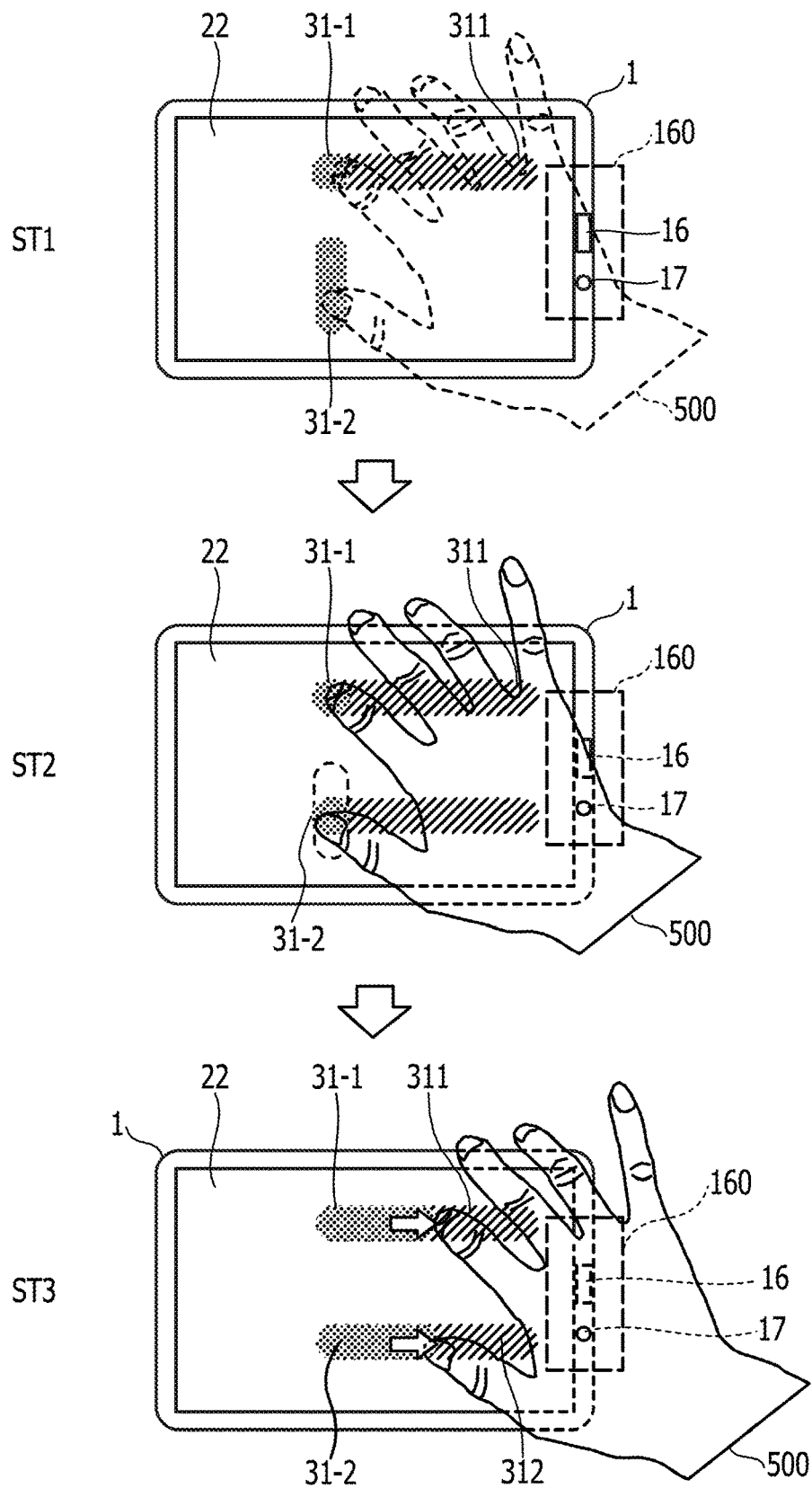
FIG. 5 is a plan view describing an example of a user operation according to the first embodiment.
Figure 6:
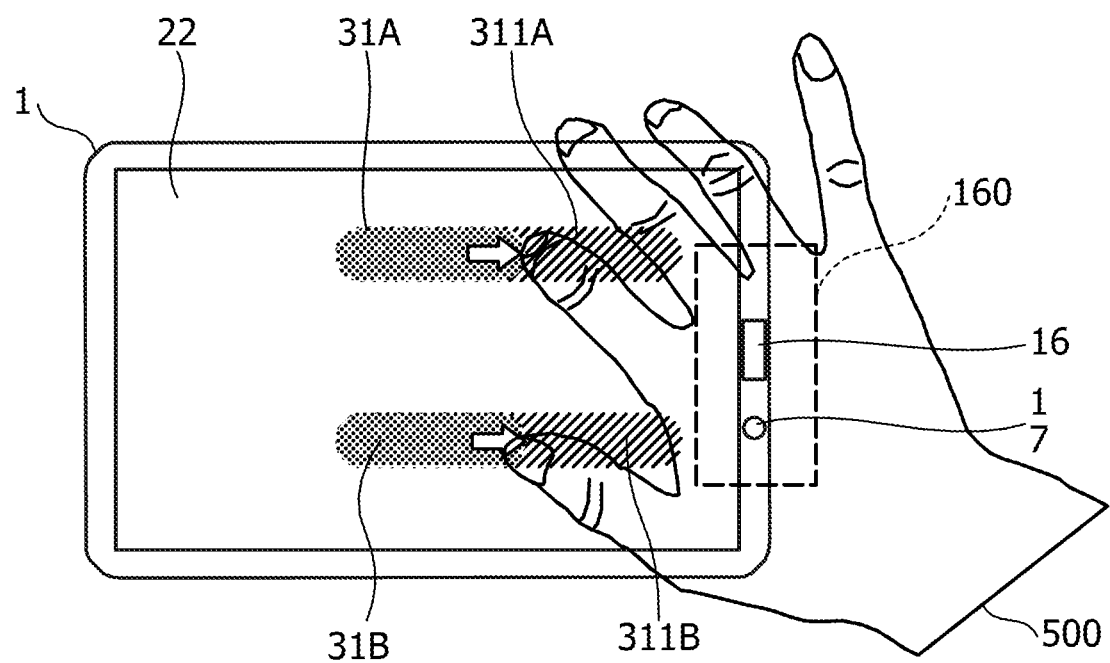
FIG. 6 is a plan view describing an example of the display of marks according to a comparative example.

Next, a first embodiment is described. FIGS. 3 to 5 are plan views describing an example of the display of marks according to the first embodiment. In addition, FIG. 6 is a plan view describing an example of the display of marks according to a comparative example.

FIG. 3 illustrates an initial state in which multiple marks 31-1 and 31-2 specifying positions at which the user uses fingers to contact the touch panel 22 of the terminal 1 are displayed on the touch panel 22 of the terminal 1. In this example, the size of the mark 31-2 is larger than the size of the mark 31-1. In addition, in this example, the length of the mark 31-2 in a vertical direction in FIG. 3 is large and the size of the mark 31-2 is large so that the user is not forced to maintain the hand in an uncomfortable posture. A guide 311 that specifies either or both of a trajectory and direction of a user operation of sliding a user's finger from the mark 31-1 is displayed for the mark 31-1 with the small size. Since the mark 31-2 with the size larger than that of the other mark 31-1 is displayed, the user may use a finger to contact the mark 31-1 at a position at which the finger is easily placed and that is based on the size of the hand of the user. The biometric sensor 16 is located in the vicinity of the touch panel 22 and attached to the surface of the terminal 1 on which the touch panel 22 is installed. The sensor 16 may include a camera and a biometric illumination light source 17.

FIG. 4 illustrates a state in which the user uses fingers to contact the marks 31-1 and 31-2 on the touch panel 22 in the initial state illustrated in FIG. 3. In this example, the mark 31-2 is displayed in such a manner that the size of the mark 31-2 with the larger size among the marks 31-1 and 31-2 contacted by the fingers is reduced. In addition, coordinates, in a vertical direction in FIG. 4, of the fingers that slide are determined in response to the contact of the user's fingers with the marks 31-1 and 31-2. Thus, a guide 312 that specifies either or both of a trajectory and direction of a user operation of sliding a user's finger from the mark 31-2 is displayed for the mark 31-2 with the reduced size.

FIG. 5 is a plan view describing an example of a user operation according to the first embodiment. In FIG. 5, sections that are the same as those illustrated in FIGS. 3 and 4 are indicated by the same reference symbols as those illustrated in FIGS. 3 and 4, and a description thereof is omitted. In an initial state ST1 illustrated in FIG. 5, the marks 31-1 and 31-2 that specify the positions at which the user uses an index finger and a thumb to contact the marks 31-1 and 31-2 are displayed on the touch panel 22. In this case, since the size of a user's hand 500 varies depending on the person, the marks 31-1 and 31-2 are displayed in such a manner that the size of the mark 31-2 specifying the position at which the thumb contacts the touch panel 22 is larger than the size of the mark 31-1. In a state in which the user uses the index finger to contact the mark 31-1, the user may use the thumb to contact the mark 31-2 at a position that is on the mark 31-2 and is based on the size of the hand 500. Thus, the marks 31-1 and 31-2 that specify the positions at which the fingers contact the touch panel 22 may be displayed on the touch panel 22 in such a manner that the user is not forced to maintain the hand in an uncomfortable posture.

In a state ST2 illustrated in FIG. 5, the user uses the fingers to contact the marks 31-1 and 31-2 on the touch panel 22 in the initial state ST1. In this example, the marks 31-1 and 31-2 are displayed in such a manner that the size of the mark 31-2 with the larger size among the marks 31-1 and 31-2 contacted by the fingers is reduced. In addition, the guide 312 that specifies either or both of a trajectory and direction of a user operation of sliding the finger is displayed for the mark 31-2 with the reduced size.

In a state ST3 illustrated in FIG. 5, the user has performed an operation of sliding the fingers from the marks 31-1 and 31-2 on the touch panel 22 in the state ST2. For convenience of the description, the guides 311 and 312 displayed in halftone are changed to the guides 311 and 312 displayed in the same black as the marks 31-1 and 31-2. In addition, in the state ST3, since the user's hand 500 has moved to an imaging range 160 suitable for palm imaging by the biometric sensor 16, palm information that is an example of user's biometric information is acquired from the biometric sensor 16. The palm information is information of palm veins, a palm print, the shape of a palm, or the like.

On the other hand, in the comparative example illustrated in FIG. 6, the sizes of marks 31A and 31B displayed on the touch panel 22 before contact are the same, and the marks 31A and 31B displayed immediately after the contact is similar to the state illustrated in FIG. 4. In addition, guides 311A and 311B are displayed in such a manner that the guides 311A and 311B extend in a horizontal direction in FIG. 6 from positions at which the corresponding marks 311A and 311B are initially displayed. Thus, if the size of the user's hand 500 is in a range estimated upon the design, the user may use fingers to relatively easily contact the marks 31A and 31B. In addition, when the user performs an operation of sliding the fingers, the biometric sensor 16 may image a palm within the imaging range 160. However, if the size of the user's hand 500 is larger or smaller than the range estimated upon the design, the user is forced to maintain the hand in an uncomfortable posture in order to use the fingers to contact the marks 31A and 31B. In addition, when the user performs the operation of sliding the fingers while being forced to maintain the hand in an uncomfortable posture, the biometric sensor 16 may not appropriately image the palm within the imaging range 160. Specifically, the palm to be imaged by the biometric sensor 16 within the imaging range 160 may not be close to a planar surface parallel to the touch panel 22 and may be inclined with respect to the touch panel 22, depending on the uncomfortable posture of the hand, or the fingers may be closed due to the uncomfortable posture, and biometric information suitable for the biometric authentication may not be acquired.

On the other hand, in the first embodiment, in the initial state ST1 illustrated in FIG. 5, since the marks 31-1 and 31-2 are displayed on the touch panel 22 in such a manner that the size of the mark 31-2 is larger than the size of the mark 31-1, the user is not forced to maintain the hand in an uncomfortable posture. In addition, the user may perform an operation of sliding the fingers while maintaining the hand in a natural posture. Thus, the biometric sensor 16 may appropriately image the palm within the imaging range 160, while the palm is in a state suitable for the imaging of the palm and is close to the planar surface parallel to the touch panel 22. Thus, biometric information suitable for the biometric authentication and indicating palm veins or the like may be acquired from the biometric sensor 16.

Figure 7:
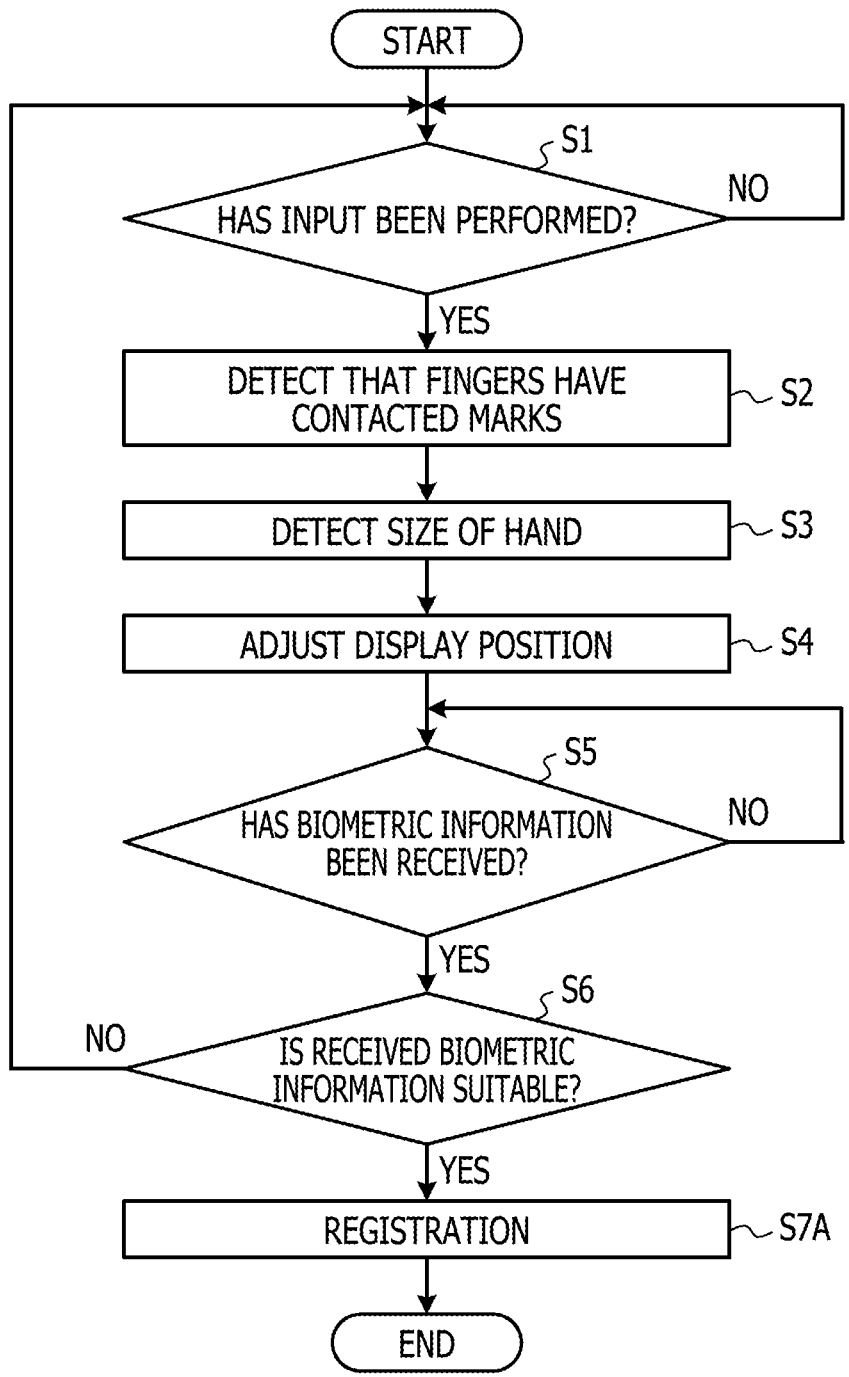
FIG. 7 is a flowchart describing an example of a process to be executed in the registration of biometric information according to the first embodiment.

FIG. 7 is a flowchart describing an example of a process to be executed in the registration of biometric information according to the first embodiment. The registration process illustrated in FIG. 7 may be executed by the CPU 11 illustrated in FIG. 1. In FIG. 7, in step S1, the CPU 11 displays the initial state ST1 illustrated in FIG. 5 on the touch panel 22 and determines whether or not input by the user or the contact of user's fingers with the marks 31-1 and 31-2 has been performed. If the result of the determination of step S1 indicates YES, the CPU 11 detects, based on a contact signal from the touch panel 22, that the user has used the fingers to contact the marks 31-1 and 31-2 on the touch panel 22 in step S2. In step S3, the CPU 11 detects the size of a hand of the user based on contact positions of the fingers on the touch panel 22, the areas of contact regions of the fingers on the touch panel 22, the shapes of the contact regions of the fingers on the touch panel 22, and the like that are indicated by the contact signal. In step S4, the CPU 11 adjusts, based on the detected size of the hand, a display position of the mark 31-2 located on the touch panel 22 and to be reduced. By executing this, the state ST2 illustrated in FIG. 5 is displayed on the touch panel 22, and the reduced mark 31-2 is displayed at the adjusted display position.

The user performs an operation of sliding the fingers on the touch panel 22 in the state ST2. In step S5, in the state ST3 in which the slide operation has been performed on the touch panel 22 and that is illustrated in FIG. 5, the CPU 11 determines whether or not biometric information has been received from the biometric sensor 16. If the result of the determination of step S5 indicates YES, the CPU 11 determines whether or not the biometric information imaged by the biometric sensor 16 within the imaging range 160 and received is suitable for the biometric authentication and indicates palm veins or the like in step S6. If the result of the determination of step S6 indicates NO, the process returns to step S1. On the other hand, if the result of the determination of step S6 indicates YES, the process proceeds to step S7A. In step S7A, the CPU 11 registers the received biometric information in, for example, the storage device 21 illustrated in FIG. 1. Then, the process is terminated.

Figure 8:
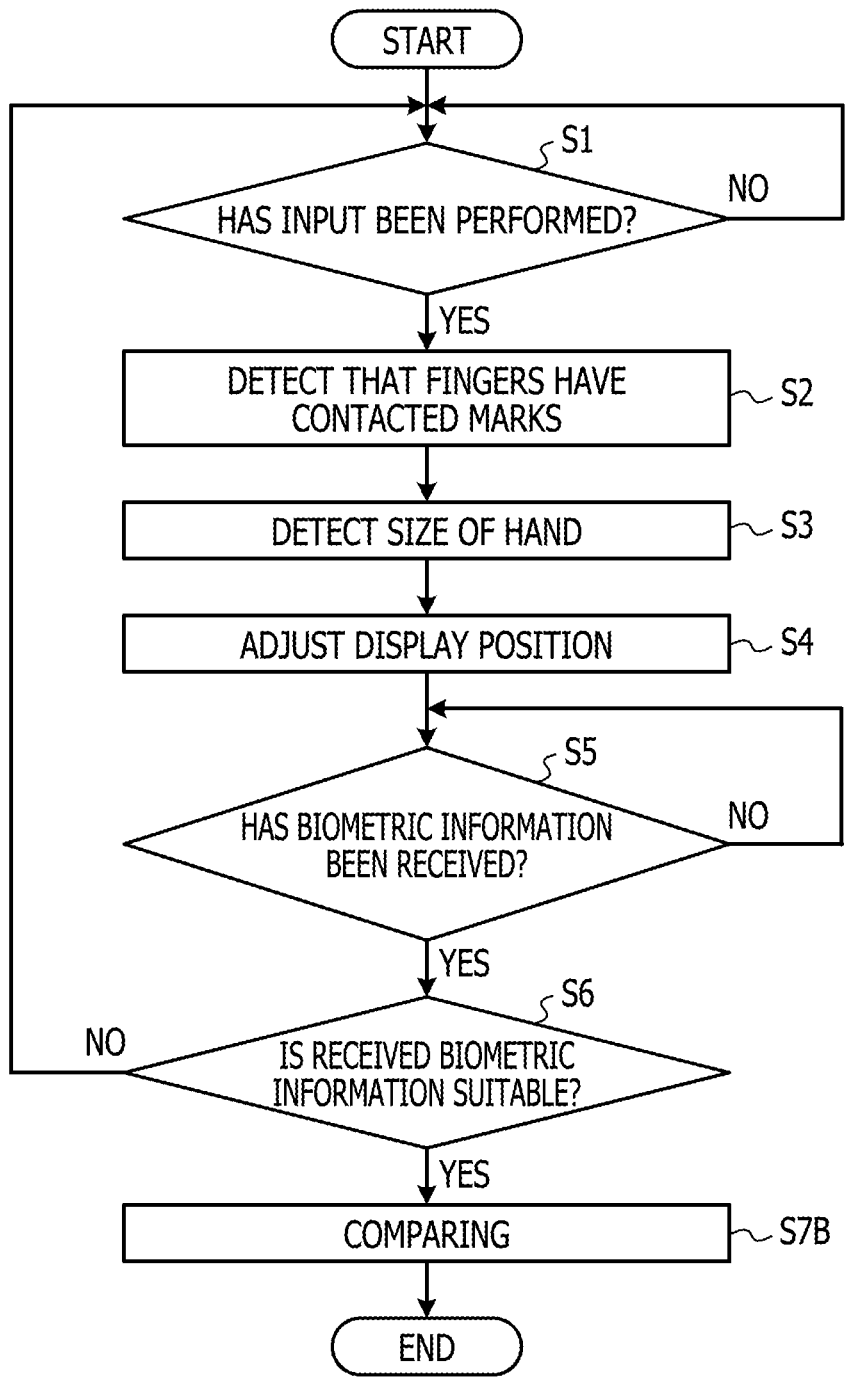
FIG. 8 is a flowchart describing an example of a process to be executed in the authentication of biometric information according to the first embodiment.

FIG. 8 is a flowchart describing an example of a process to be executed in the authentication of biometric information according to the first embodiment. The authentication process illustrated in FIG. 8 may be executed by the CPU 11 illustrated in FIG. 1. In FIG. 8, steps that are the same as those illustrated in FIG. 7 are indicated by the same reference symbols as those illustrated in FIG. 7, and a description thereof is omitted. In the authentication of biometric information, biometric information is already registered in, for example, the storage device 21 illustrated in FIG. 1 by the registration process illustrated in FIG. 7. Thus, in step S7B illustrated in FIG. 8, the CPU 11 compares biometric information received in the authentication of biometric information with the biometric information registered in, for example, the storage device 21 illustrated in FIG. 1. If biometric characteristic information indicating characteristics of the biometric information is already registered, the biometric information to be compared may be the biometric characteristic information indicating the characteristics of the biometric information. If the biometric information acquired in the authentication matches the registered biometric information in step S7B, the CPU 11 determines that the biometric authentication has been successful, and the CPU 11 outputs the comparing result indicating that the user is the identical person. Then, the process is terminated. According to the first embodiment, the accuracy of the authentication may be high, regardless of individual differences between the sizes of hands of users.

Second Embodiment

Figure 9:
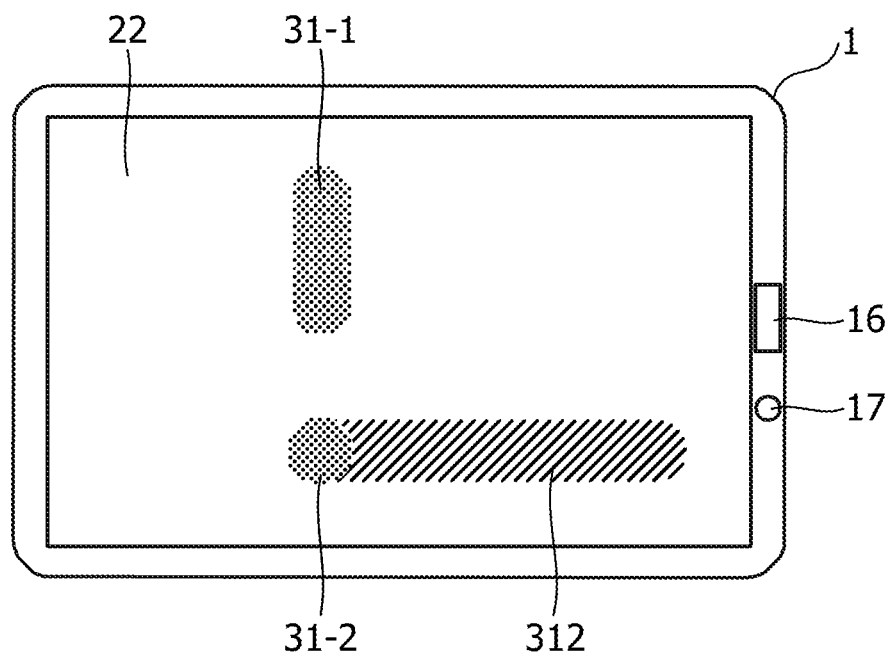
FIG. 9 is a plan view describing an example of the display of marks according to a second embodiment.

Next, a second embodiment is described. Ergonomically speaking, a motion range of a thumb is larger than those of the other fingers. Thus, in the aforementioned first embodiment, the marks are displayed on the touch panel in such a manner that the size of the mark specifying the position at which the thumb contacts the touch panel is larger than the size of the mark specifying the position at which another finger contacts the touch panel. On the other hand, in the second embodiment, as illustrated in FIG. 9, marks 31-1 and 31-2 are displayed on the touch panel 22 in such a manner that the size of the mark 31-1 specifying a position at which the index finger contacts the touch panel 22 is larger than the size of the mark 31-2 specifying a position at which another finger contacts the touch panel 22. FIG. 9 is a plan view describing an example of the display of the marks according to the second embodiment. In FIG. 9, sections that are the same as those illustrated in FIGS. 3 and 4 are indicated by the same reference symbols as those illustrated in FIGS. 3 and 4, and a description thereof is omitted. According to the second embodiment, the user may freely select a position on the mark having the larger size and displayed on the touch panel 22 based on the size of the user's hand, a trajectory and direction of an operation of sliding fingers, and the like.

Third Embodiment

Figure 10:
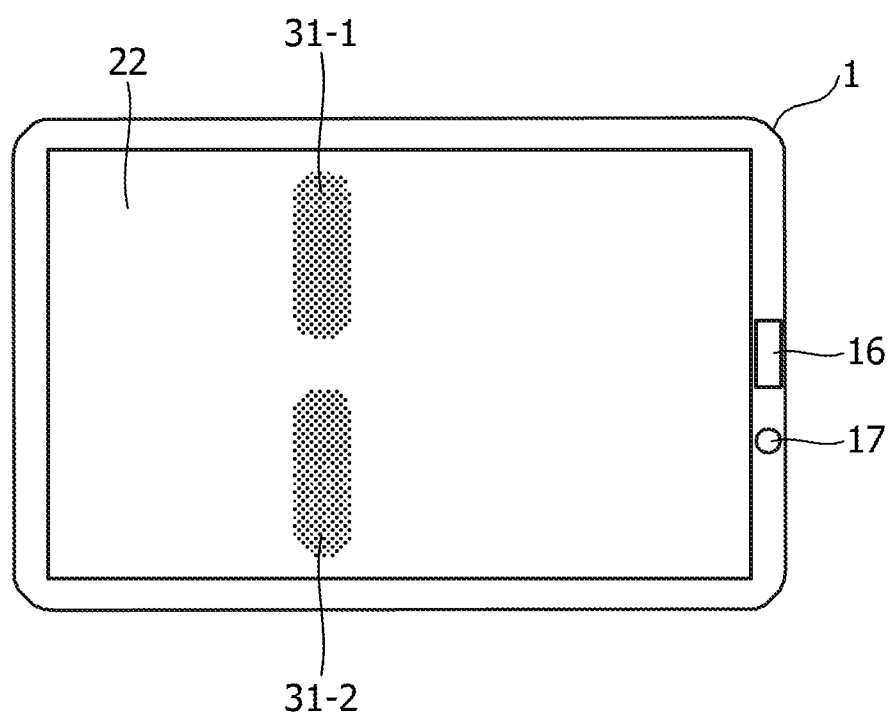
FIG. 10 is a plan view describing an example of the display of marks according to a third embodiment.

Next, a third embodiment is described. In the third embodiment, as illustrated in FIG. 10, a mark 31-1 specifying a position at which the index finger contacts the touch panel 22 and a mark 31-2 specifying a position at which the thumb contacts the touch panel 22 are displayed on the touch panel 22 and have large sizes. FIG. 10 is a plan view describing an example of the display of the marks according to the third embodiment. In FIG. 10, sections that are the same as those illustrated in FIGS. 3 and 4 are indicated by the same reference symbols as those illustrated in FIGS. 3 and 4, and a description thereof is omitted. According to the third embodiment, the marks 31-1 and 31-2 that specify the positions that are on the touch panel 22 and at which the user uses the index finger and the thumb to contact the touch panel 22 may have ranges (or margins). According to the third embodiment, the marks 31-1 and 31-2 that specify the positions at which the user uses the fingers to contact the touch panel 22 may be displayed on the touch panel 22 in such a manner that the user is not forced to maintain the hand in an uncomfortable posture.

Fourth Embodiment

Figure 11:
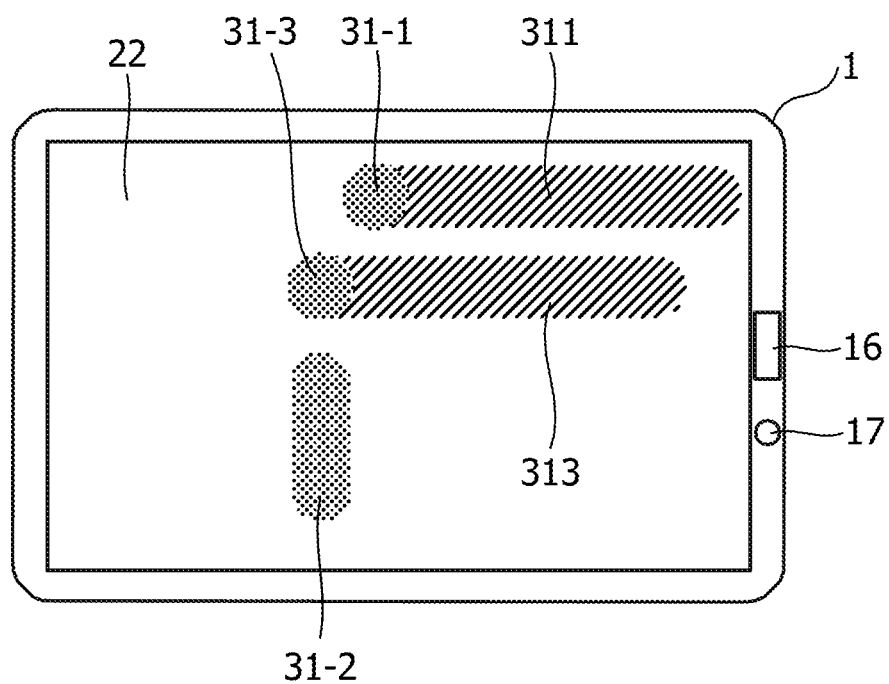
FIG. 11 is a plan view describing an example of the display of marks according to a fourth embodiment.

Next, a fourth embodiment is described. In the fourth embodiment, as illustrated in FIG. 11, marks 31-1, 31-2, and 31-3 that specify positions at which the user uses three or more fingers to contact the touch panel 22 are displayed on the touch panel 22 in such a manner that the size of the mark 31-2 that specifies a position at which the user uses, for example, a single finger (or a thumb in this example) to contact the touch panel 22 is larger than those of the marks 31-1 and 31-3 that specify positions at which the user uses the other fingers to contact the touch panel 22. A guide 313 is displayed for the mark 31-3. FIG. 11 is a plan view describing an example of the display of the marks according to the fourth embodiment. In FIG. 11, sections that are the same as those illustrated in FIGS. 3 and 4 are indicated by the same reference symbols as those illustrated in FIGS. 3 and 4, and a description thereof is omitted. According to the fourth embodiment, the marks 31-1 to 31-3 that specify the positions at which the fingers contact the touch panel 22 are displayed on the touch panel 22 that is contacted by the user using three or more fingers in such a manner that one or more of the marks have a range for one or more fingers. According to the fourth embodiment, the marks 31-1 to 31-3 that specify the positions at which the fingers contact the touch panel 22 may be displayed in such a manner that the user stably performs an operation of sliding the fingers on the touch panel 22 while not being forced to maintain the hand in an uncomfortable posture.

Fifth Embodiment

Figure 12:
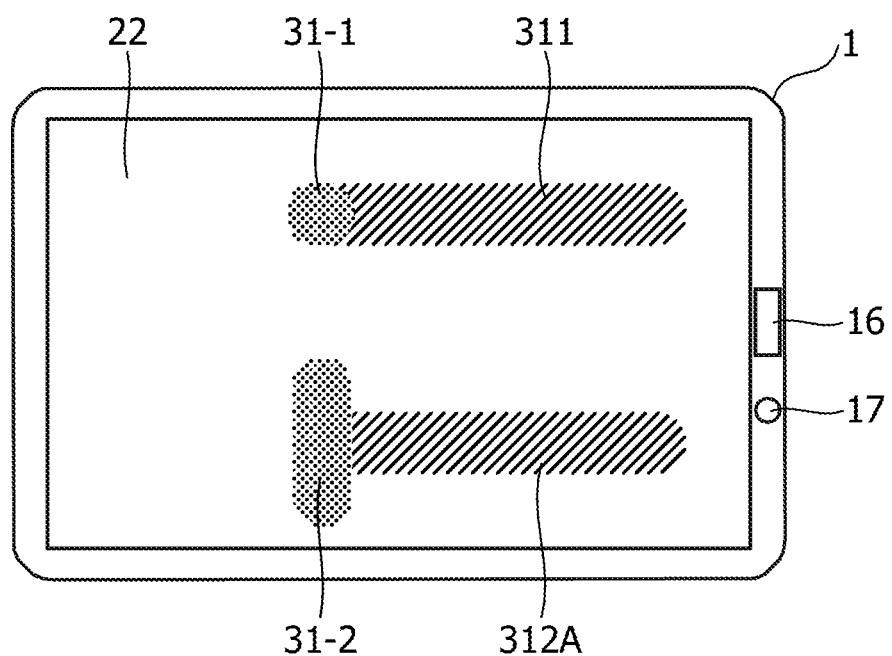
FIG. 12 is a plan view describing an example of the display of marks according to a fifth embodiment.

Next, a fifth embodiment is described. In the fifth embodiment, as illustrated in FIG. 12, a representative guide 312A is displayed for a mark 31-2 to be reduced. In this example, the guide 312A extends in a horizontal direction from a central portion of the large mark 31-2 in a vertical direction in FIG. 12. FIG. 12 is a plan view describing an example of the display of marks according to the fifth embodiment. In FIG. 12, sections that are the same as those illustrated in FIGS. 3 and 4 are indicated by the same reference symbols as those illustrated in FIGS. 3 and 4, and a description thereof is omitted. According to the fifth embodiment, the user may easily image a sliding direction and the like for the large mark 31-2 before performing an operation of sliding fingers.

Sixth Embodiment

Figure 13:
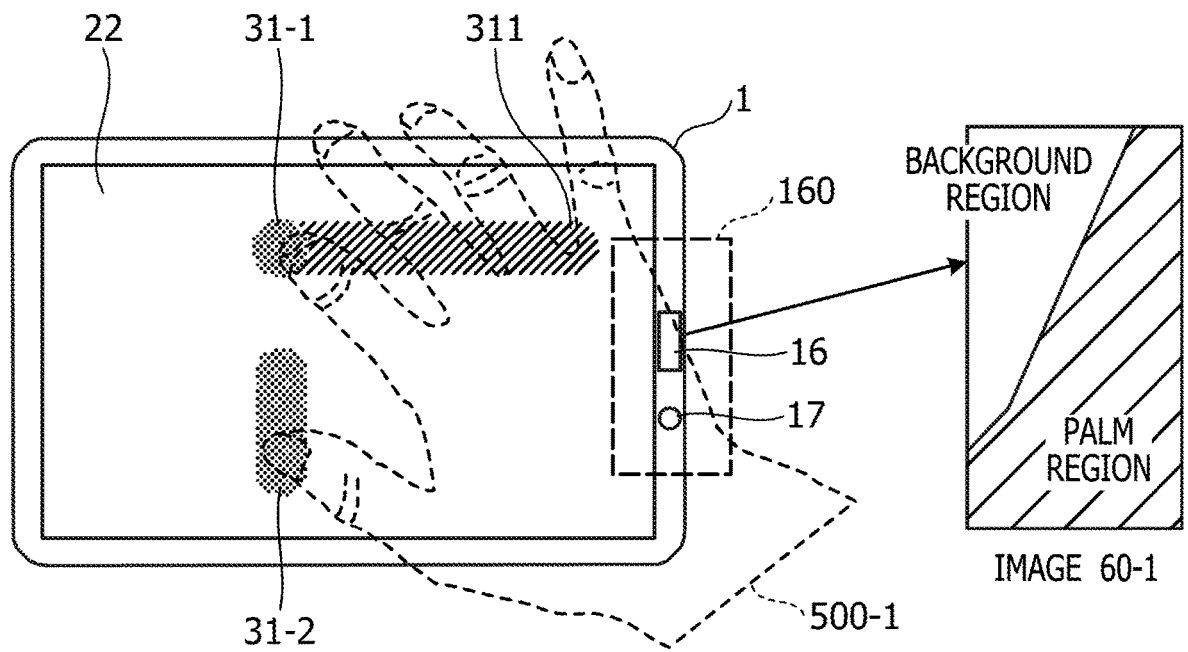
FIG. 13 is a plan view describing an example of the detection of a large hand according to a sixth embodiment.
Figure 14:
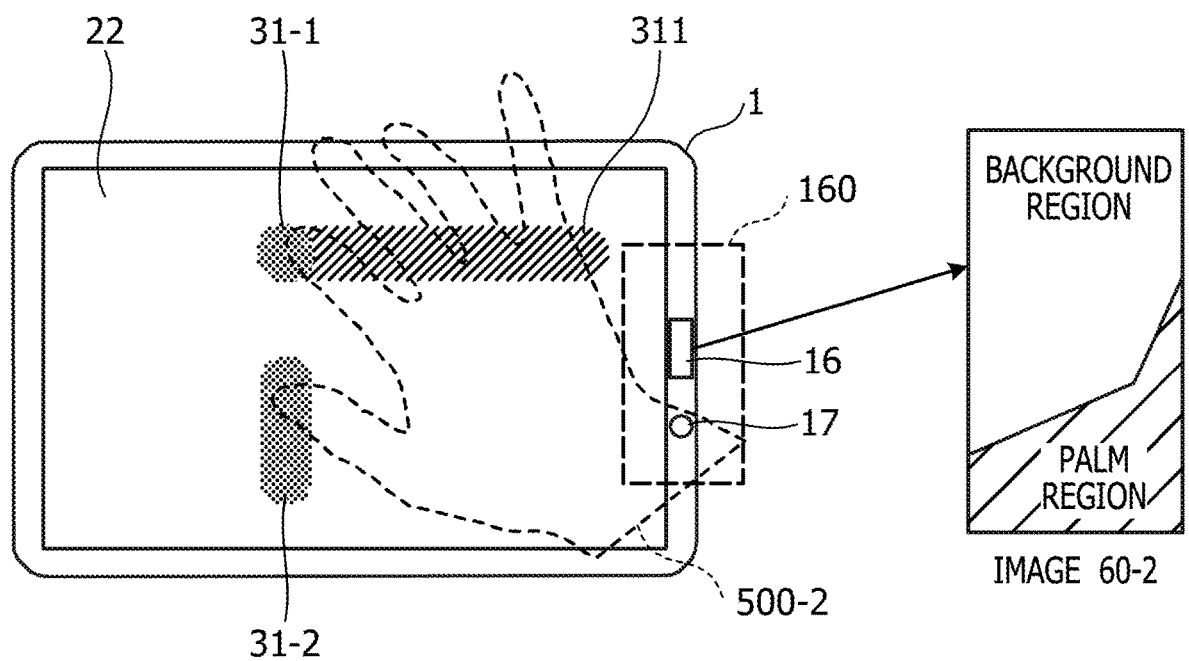
FIG. 14 is a plan view describing an example of the detection of a small hand according to the sixth embodiment.

Next, a sixth embodiment is described. In the aforementioned first to fifth embodiments, the size of the hand of the user is detected based on positions that are on the touch panel 22 and at which the user has contacted the touch panel 22 using fingers. For example, even if the hand is large and the user uses fingers to contact the touch panel 22 while closing fingers, the size of the hand is detected as a size smaller than the actual hand. Thus, the size of the hand may be erroneously detected, depending on the posture of the hand, how to place the hand, or the like. In the sixth embodiment, the size of the hand is detected based on an image captured by the biometric sensor 16 when the user uses fingers to contact the touch panel. FIG. 13 is a plan view describing an example of the detection of a large hand. FIG. 14 is a plan view describing an example of the detection of a small hand. In FIGS. 13 and 14, sections that are the same as those illustrated in FIG. 3 are indicated by the same reference symbols as those illustrated in FIG. 3, and a description thereof is omitted.

If a hand 500-1 of a user is large, the area of a palm region indicated by hatching and included in an image 60-1 captured by the biometric sensor 16 is larger than the area of a background region included in the image 60-1, as illustrated in an enlarged manner on the right side of FIG. 13. On the other hand, if a hand 500-2 of a user is small, the area of a palm region indicated by hatching and included in an image 60-2 captured by the biometric sensor 16 is smaller than the area of a background region included in the image 60-2, as illustrated in an enlarged manner on the right side of FIG. 14. Thus, whether or not the position of a user's thumb contacting the touch panel 22 is appropriate is determined by determining whether or not the area of a palm region within an image (for example, images 60-1 and 60-2) captured by the biometric sensor 16 is equal to or larger than a threshold. For example, in the state ST2 illustrated in FIG. 5, the length (or the position at which the thumb contacts the touch panel) of the mark 31-2 in the vertical direction is adjusted in such a manner that the area of a palm region within an image captured by the biometric sensor 16 is equal to or larger than the threshold. According to the sixth embodiment, multiple marks including the mark 31-2 may be displayed on the touch panel 22 in such a manner that biometric information suitable for the biometric authentication is acquired from the biometric sensor 16, regardless of the size of the hand of the user.

Seventh Embodiment

Figure 15:
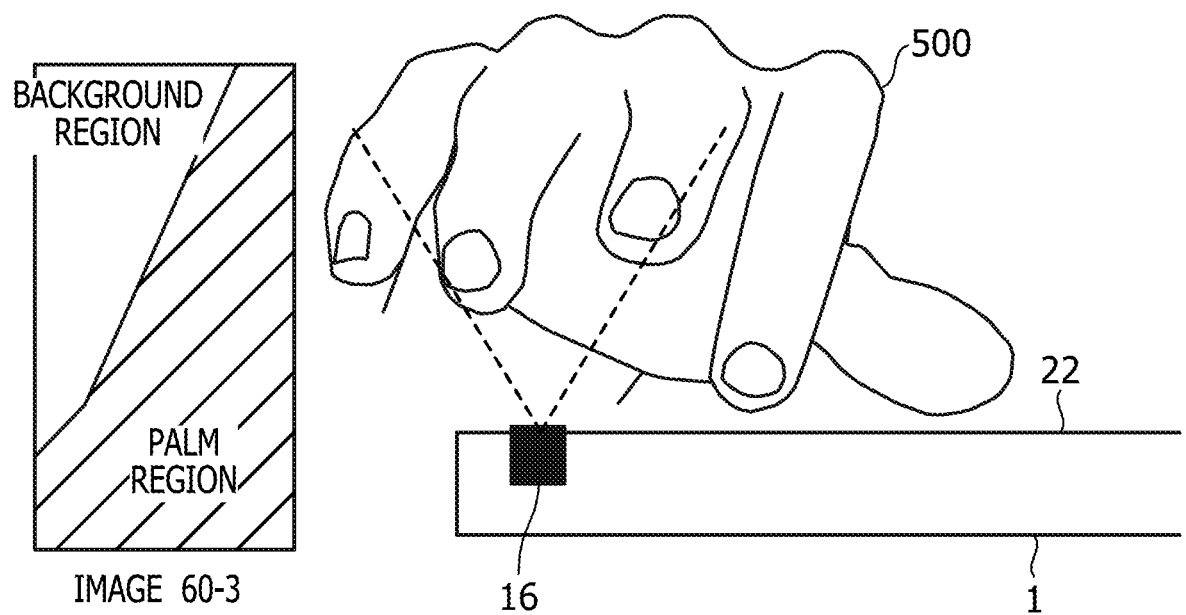
FIG. 15 is a plan view describing an example of the detection of the inclination of a hand according to a seventh embodiment.
Figure 16:
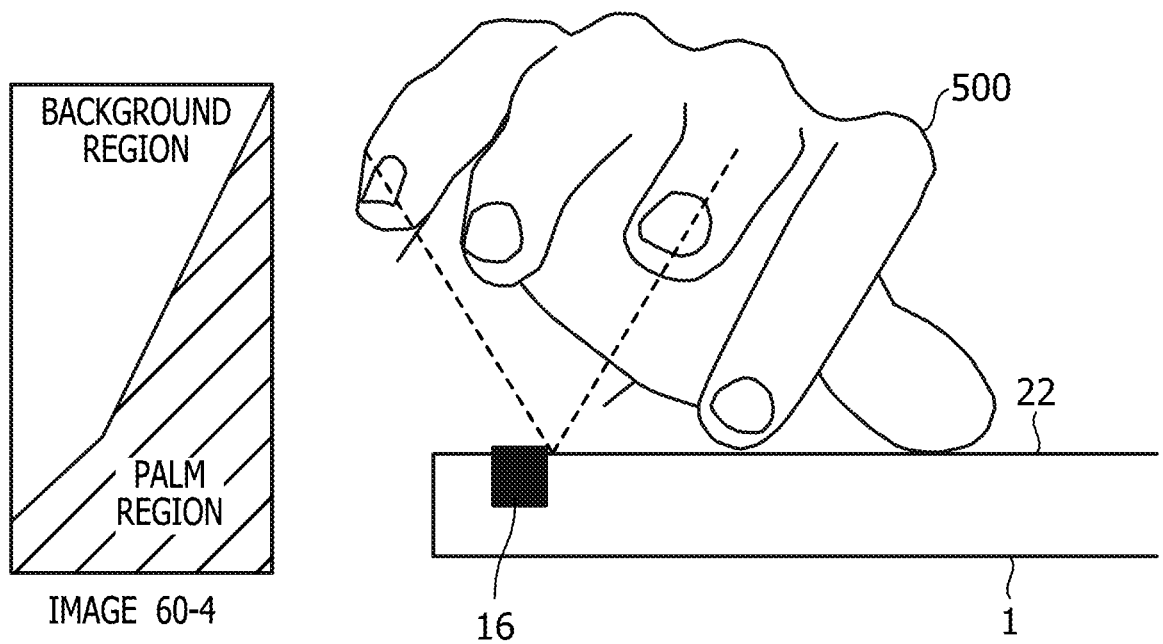
FIG. 16 is a plan view describing an example of the detection of the inclination of the hand according to the seventh embodiment.

Next, a seventh embodiment is described. In the aforementioned sixth embodiment, the size of a user's hand is detected from an image captured by the biometric sensor. On the other hand, in the seventh embodiment, the size of a user's hand and the inclination of the user's hand with respect to the touch panel 22 are detected. FIGS. 15 and 16 are side views describing an example of the detection of the inclination of a hand according to the seventh embodiment. If the palm of the user is close to the planar surface parallel to the touch panel 22 as illustrated in FIG. 15, the area of a palm region indicated by hatching and included in an image 60-3 captured by the biometric sensor 16 is larger than the area of a background region included in the image 60-3, as illustrated in an enlarged manner on the right side of FIG. 15. On the other hand, if the hand 500 is inclined with respect to the touch panel 22, the area of a palm region indicated by hatching and included in an image 60-4 captured by the biometric sensor 16 is smaller than a background region included in the image 60-4, as illustrated in an enlarged manner on the left side of FIG. 16.

The CPU 11 may have a known function of detecting the distance between the biometric sensor 16 and a target object to be imaged or a vertical position of the hand 500 from the touch panel 22. In this case, the size of the hand 500 of the user may be detected based on the detected vertical position of the hand 500 and the area of a palm region within an image captured by the biometric sensor 16. Whether or not the posture of the user's hand 500 with respect to the touch panel 22 is appropriate may be determined by calculating the relationship between the vertical position of the hand 500 and the area of the palm region included in the image captured by the biometric sensor 16 in the state illustrated in FIG. 15 in advance and determining whether or not the relationship between the vertical position of the hand 500 and the area of the palm region included in the image captured by the biometric sensor 16 in the state illustrated in FIG. 16 satisfies the relationship calculated in advance. If it is determined that the posture of the user's hand 500 with respect to the touch panel 22 is not appropriate, the result of the determination of step S6 illustrated in FIGS. 7 and 8 indicates NO, for example. In this case, the CPU 11 may output a message prompting the user to correct the posture of the hand 500 and place the palm close to the planer surface parallel to the touch panel 22 and may cause the process to return step S1. According to the seventh embodiment, the user may be efficiently prompted to correct the posture of the hand 500.

Eighth Embodiment

Figure 17:
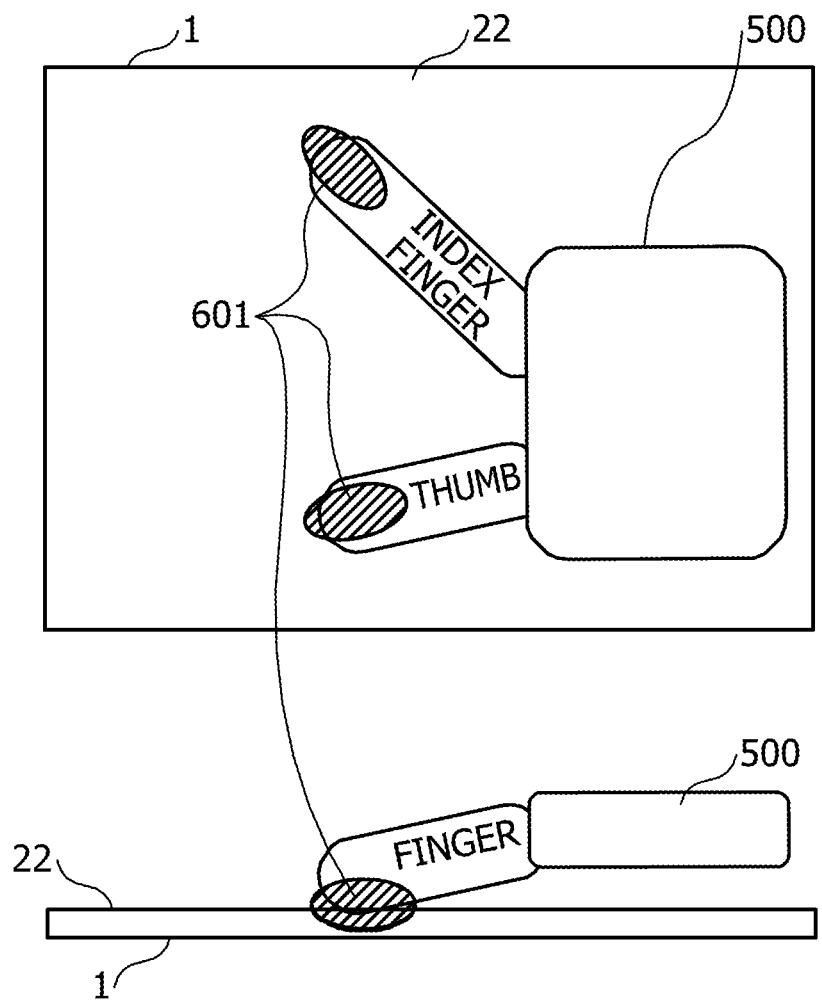
FIG. 17 is a plan view describing an example of the detection of the size of the hand according to an eighth embodiment.
Figure 18:
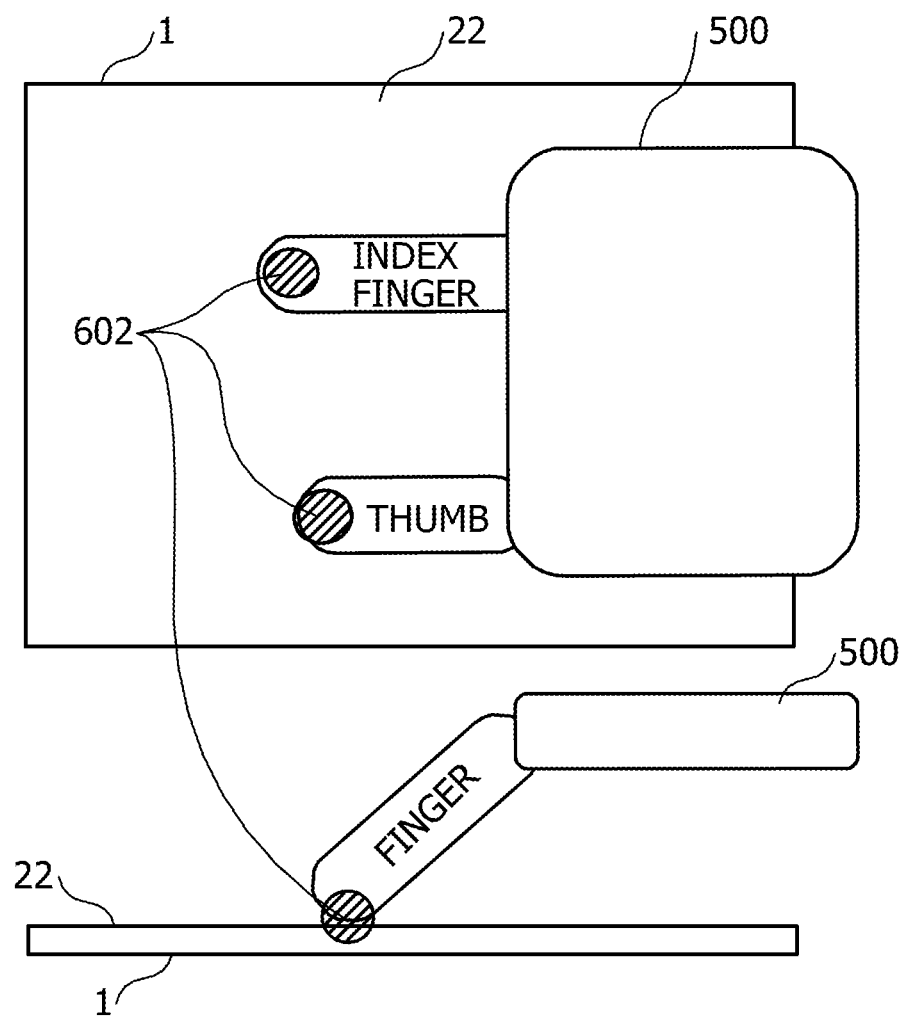
FIG. 18 is a plan view describing an example of the detection of the size of the hand according to the eighth embodiment.

Next, an eighth embodiment is described. In the aforementioned sixth and seventh embodiments, the size of a user's hand is detected from an image captured by the biometric sensor. In the eighth embodiment, the size of the hand is detected based on contact states of user's fingers on the touch panel 22. FIGS. 17 and 18 are schematic diagrams describing examples of the detection of the size of the hand according to the eighth embodiment. FIGS. 17 and 18 illustrate schematic plan views on the upper sides and schematic side views on the lower sides.

If a user with a small hand uses fingers to contact marks on the touch panel 22 while being forced to spread the fingers, angles between the fingers and the touch panel 22 are small and ranges 601 in which the fingers contact the touch panel 22 are large and in long and thin shapes in directions in which the fingers extend, as illustrated in FIG. 17. In addition, since the user spreads the fingers, the index finger and the thumb form a "V" shape in a plan view.

On the other hand, if a user with a large hand uses fingers to contact the marks on the touch panel 22 while being forced to close the fingers, ranges 602 in which the fingers contact the touch panel 22 are small and in shapes that are short in directions in which the fingers extend, as illustrated in FIG. 18. In addition, the index finger and the thumb extend in the directions nearly parallel to each other in a plan view.

Thus, according to the eighth embodiment, the sizer of the hand is detected based on the contact states of the user's fingers on the touch panel 22, as illustrated in FIGS. 17 and 18.

Ninth Embodiment

Next, a ninth embodiment is described. The size of a hand that is detected in each of the aforementioned first to eighth embodiments may be used as a part of biometric information to be compared. For example, if biometric information acquired in the registration of biometric information, and information of the size of the hand, are associated with each other and registered, the size of the hand may be used in the authentication of biometric information. For example, a matching degree of the information of the size of the hand may be included in an authentication score, and the accuracy of the authentication may be improved. In addition, if the terminal 1 is shared by multiple users, the accuracy of the authentication and the speed of the authentication may be improved by determining, based on the sizes of hands, the order in which multiple templates are searched.

Tenth Embodiment

Next, a tenth embodiment is described. The size of a hand that is detected in each the aforementioned first to eighth embodiments may be used as a part of search information. If the number of users who use the terminal 1 is limited to one, the improvement of the usability and a reduction in a false non-match rate may be expected by displaying, on the touch panel 22, fingers' positions registered based on the detected size of the hand in the authentication of biometric information. Alternatively, the registered fingers' positions may not be displayed on the touch panel 22 in an initial state, and if the authentication process fails a predetermined number of times, the registered fingers' positions may be displayed on the touch panel 22.

If the terminal 1 is used by multiple users, priorities may be given to fingers' positions based on the frequency of use, elapsed time after the previous use, and the like, and the display of the fingers' positions may be determined based on the priorities. In this case, if the authentication process fails a predetermined number of times, registered positions may be updated to positions for a user of the next priority.

According to the tenth embodiment, the speed of the authentication may be improved by using the size of a hand as a part of search information.

Each of the aforementioned embodiments describes the case where the user operates the touch panel with the right hand. If the user operates the touch panel with the left hand, it is sufficient if, in a state in which the terminal 1 illustrated in FIG. 3 is rotated at an angle of 180 degrees, information bilaterally symmetric with respect to the displayed state illustrated in FIG. 3 is displayed on the touch panel 22. In this case, coordinates at which the marks are displayed are adjusted based on a relative position of the biometric sensor 16 with respect to the touch panel 22.

The biometric authentication is not limited to the palm authentication and may be finger vein authentication or the like. In addition, the palm authentication is not limited to the palm vein authentication and may be biometric authentication using biometric information such as palm prints, the shapes of palms, or the like, for example.

According to the aforementioned embodiments, in the biometric authentication that is executed while multiple fingers contact the touch panel, the accuracy of the authentication may be high, regardless of individual differences between the sizes of users' hands. In addition, the accuracy of the authentication may be improved by supporting natural input based on the sizes of users' hands.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus, comprising:
    a biometric sensor configured to capture an image of a hand of a user;
    a touch panel configured to output a contact signal indicating contact positions of fingers of the user in response to the reception of an operation by the fingers of the user; and
    control circuitry configured to
        display, on the touch panel, a plurality of marks each of which indicates a position at which any of the fingers of the user is intended to come into contact with the touch panel,
        acquire the contact signal output from the touch panel,
        reduce in size one or more marks among the plurality of marks during acquiring biometric information from the image captured by the biometric sensor when the control circuitry detects, in accordance with the contact signal, that the fingers of the user are in contact with the plurality of marks, and
        display, on the touch panel, the one or more marks whose size has been reduced together with the remaining ones of the plurality of marks, and a respective guide indicative of either or both of a trajectory and a direction of a user operation of sliding a finger from each of the one or more marks whose size has been reduced and from each of the remaining ones of the plurality of marks.

2. The biometric authentication apparatus according to claim 1,
    wherein the control circuitry is configured to adjust one or more display positions of the one or more marks to be reduced in size, based on the contact signal.

3. The biometric authentication apparatus according to claim 1,
    wherein the control signal includes the contact positions on the touch panel and a planar dimension of contact regions contacted by a surface of the fingers of the user at the contact positions, and
    wherein the control circuitry is configured to adjust one or more display positions of the one or more marks to be reduced, based on the planar dimension indicated by the control signal.

4. The biometric authentication apparatus according to claim 1,
    wherein the control signal includes the contact positions on the touch panel and a shape with respect to each of contact regions contacted by a surface of the fingers of the user at the contact positions, and
    wherein the control circuitry is configured to adjust one or more display positions of the one or more marks to be reduced, based on the shape indicated by the contact signal.

5. The biometric authentication apparatus according to claim 1,
    wherein the control signal includes the contact positions on the touch panel, a planar dimension of contact regions contacted by a surface of the fingers of the user at the contact positions, and a shape with respect to each of the fingers of the user at the contact positions, and
    wherein the control circuitry is configured to display, on the touch panel, an instruction related to either or both of trajectories and directions of an operation of sliding the fingers of the user from the plurality of marks, based on one or more types of the contact positions indicated by the contact signal, the planar dimension indicated by the contact signal, and the shape indicated by the contact signal.

6. The biometric authentication apparatus according to claim 5,
    wherein when the control circuitry detects, based on the control signal, that the user is performing the operation of sliding the fingers from the plurality of marks, the control circuitry is configured to acquire the biometric information from the image captured by the biometric sensor during the slide operation.

7. The biometric authentication apparatus according to claim 6,
    wherein the control circuitry is configured to continuously or regularly acquire the biometric information from the image captured by the biometric sensor during the slide operation.

8. The biometric authentication apparatus according to claim 1,
    wherein the biometric sensor is configured to capture an image of any of a palm vein, palm print, and finger vein of the user.

9. A biometric authentication method performed by a computer, comprising:
    displaying, on a touch panel, a plurality of marks each of which indicates a position at which any of fingers of a user is intended to come into contact with the touch panel;
    acquiring, from the touch panel, a contact signal indicating contact positions of the fingers of the user;
    reducing in size one or more marks among the plurality of marks during acquiring biometric information from an image captured by a biometric sensor when the contact of the fingers of the user with the plurality of marks is detected in accordance with the contact signal; and
    displaying, on the touch panel, the one or more marks whose size has been reduced together with the remaining ones of the plurality of marks, and a respective guide indicative of either or both of a trajectory and a direction of a user operation of sliding a finger from each of the one or more marks whose size has been reduced and from each of the remaining ones of the plurality of marks.

10. The biometric authentication method according to claim 9, further comprising:
adjusting one or more display positions of the one or more marks to be reduced, based on the contact signal.

11. The biometric authentication method according to claim 10,
wherein the control signal includes the contact positions on the touch panel and a planar dimension of contact regions contacted by a surface of the fingers of the user at the contact positions, and
wherein the adjusting adjusts one or more display positions of the one or more marks to be reduced, based on the planar dimension indicated by the control signal.

12. The biometric authentication method according to claim 10,
wherein the control signal includes the contact positions on the touch panel and a shape with respect to each of contact regions contacted by a surface of the fingers of the user at the contact positions, and
wherein the adjusting adjusts one or more display positions of the one or more marks to be reduced, based on the shape indicated by the contact signal.

13. The biometric authentication method according to claim 10,
wherein the control signal includes the contact positions on the touch panel, a planar dimension of contact regions contacted by a surface of the fingers of the user at the contact positions, and a shape with respect to each of the fingers of the user at the contact positions, and
wherein the displaying displays, on the touch panel, an instruction related to either or both of trajectories and directions of an operation of sliding the fingers of the user from the plurality of marks, based on one or more types of the contact positions indicated by the contact signal, the planar dimension indicated by the contact signal, and the shape indicated by the contact signal.

14. The biometric authentication method according to claim 9,
wherein the biometric sensor is configured to capture an image of any of a palm vein, palm print, and finger vein of the user.

15. A non-transitory computer-readable storage medium storing a program for biometric authentication, the program causing a computer to execute a process, the process comprising:
displaying, on a touch panel, a plurality of marks each of which indicates a position at which any of fingers of a user is intended to come into contact with the touch panel;
acquiring, from the touch panel, a contact signal indicating contact positions of the fingers of the user;
reducing in size one or more marks among the plurality of marks during acquiring biometric information from an image captured by a biometric sensor when the contact of the fingers of the user with the plurality of marks is detected in accordance with the contact signal; and
displaying, on the touch panel, the one or more marks whose size has been reduced together with the remaining ones of the plurality of marks, and a respective guide indicative of either or both of a trajectory and a direction of a user operation of sliding a finger from each of the one or more marks whose size has been reduced and from each of the remaining ones of the plurality of marks.

* * * * *